US010100679B2

(12) United States Patent
Geveci et al.

(10) Patent No.: US 10,100,679 B2
(45) Date of Patent: Oct. 16, 2018

(54) CONTROL SYSTEM FOR MANAGING STEAM TURBINE ROTOR STRESS AND METHOD OF USE

(71) Applicant: General Electric Company, Schenectady, NY (US)

(72) Inventors: Mert Geveci, Niskayuna, NY (US); John Lawrence Meyer, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 461 days.

(21) Appl. No.: 14/839,612

(22) Filed: Aug. 28, 2015

(65) Prior Publication Data

US 2017/0058715 A1    Mar. 2, 2017

(51) Int. Cl.
*G01L 5/00* (2006.01)
*F01K 23/10* (2006.01)
(Continued)

(52) U.S. Cl.
CPC .............. *F01K 23/10* (2013.01); *F01D 19/02* (2013.01); *F01K 7/165* (2013.01); *F01K 13/02* (2013.01);
(Continued)

(58) Field of Classification Search
CPC ........ F01D 19/02; F01K 13/02; F01K 23/101; F01K 7/165; F05D 2220/31;
(Continued)

(56) References Cited

U.S. PATENT DOCUMENTS

| 4,132,076 A | 1/1979 | Weiss |
| 4,181,840 A | 1/1980 | Osborne |

(Continued)

FOREIGN PATENT DOCUMENTS

| EP | 2871334 A1 | 5/2015 |
| GB | 2166200 A | 4/1986 |

OTHER PUBLICATIONS

EPO Extended Search Report for related application 16185197.7 dated Mar. 17, 2017; 7 pp.
(Continued)

*Primary Examiner* — Elias Desta
(74) *Attorney, Agent, or Firm* — GE Global Patent Operation; John P. Darling

(57) ABSTRACT

A control system for a power plant includes a sensor that measures a rotor surface temperature of a steam turbine rotor, where the temperature is a function of exhaust gasses from a heat source for heating steam to a target temperature. The control system includes a controller coupled to the sensor and configured to compute the target temperature using an inverse process model for steam turbine rotor stress dynamics, and based on a reference steam turbine rotor stress and a feedback steam turbine rotor stress, compute a measured steam turbine rotor stress based on a measured surface temperature of the steam turbine rotor, compute an estimated steam turbine rotor stress using a process model for the steam turbine rotor stress dynamics, and based on the target temperature, and compute the feedback steam turbine rotor stress based on the measured steam turbine rotor stress and the estimated steam turbine rotor stress.

14 Claims, 8 Drawing Sheets

(51) Int. Cl.
*G01L 1/00* (2006.01)
*F01D 19/02* (2006.01)
*F01K 7/16* (2006.01)
*F01K 13/02* (2006.01)

(52) U.S. Cl.
CPC .............. *F01K 23/101* (2013.01); *G01L 1/00* (2013.01); *F05D 2220/31* (2013.01); *F05D 2220/32* (2013.01); *F05D 2220/76* (2013.01); *F05D 2240/24* (2013.01); *F05D 2260/81* (2013.01); *F05D 2260/941* (2013.01); *F05D 2270/20* (2013.01); *F05D 2270/80* (2013.01)

(58) Field of Classification Search
CPC ............. F05D 2220/32; F05D 2220/76; F05D 2240/24; F05D 2270/20; G01L 1/00
See application file for complete search history.

(56) References Cited

U.S. PATENT DOCUMENTS

| | | | |
|---|---|---|---|
| 4,228,359 A | 10/1980 | Matsumoto et al. | |
| 4,303,369 A | 12/1981 | Hisano et al. | |
| 5,498,131 A | 3/1996 | Minto | |
| 6,939,100 B2 | 9/2005 | Kirchhof | |
| 7,980,053 B2 | 7/2011 | Yakushi et al. | |
| 8,176,723 B2 | 5/2012 | Welch et al. | |
| 8,240,148 B2 | 8/2012 | Matsumoto et al. | |
| 8,321,104 B2* | 11/2012 | Mahmood | F01D 11/24 701/100 |
| 8,433,450 B2* | 4/2013 | Francino | F01K 9/003 700/28 |
| 8,644,963 B2 | 2/2014 | Gao et al. | |
| 8,857,184 B2 | 10/2014 | Sathyanarayana et al. | |
| 2005/0085949 A1 | 4/2005 | Kirchhof et al. | |
| 2009/0319060 A1 | 12/2009 | Wojsznis et al. | |
| 2011/0146276 A1 | 6/2011 | Sathyanarayana et al. | |

OTHER PUBLICATIONS

Nakai et al., "Turbine Start-Up Algorithm Based on Prediction of Rotor Thermal Stress", SICE '95. Proceedings of the 34th SICE Annual Conference. International Session Papers, pp. 1561-1564, Jul. 1995.

Gulen et al., "Gas Turbine Combined Cycle Fast Start: The Physics Behind the Concept", Power Engineering, vol. No. 117, Issue No. 06, pp. 1-10, Dec. 6, 2013.

Zhu Jian-Fei et al.; "Thermal Stress Monitoring & Control in 1 000 MW Ultra-Superciritical Steam Turbine", East China Electric Power Test and Research Institute Co., Ltd, Shanghai 200437; Shanghai Shangdian Electric Power Engineering Co., Ltd., Shanghai 200025, China.

* cited by examiner

CONTROL SYSTEM FOR MANAGING STEAM TURBINE ROTOR STRESS AND METHOD OF USE

BACKGROUND

The field of the disclosure relates generally to power plants and, more particularly, to a control system for managing steam turbine rotor stress and methods of use thereof.

A typical known combined cycle power plant includes a gas turbine in which a fuel, such as, for example, and without limitation, oil, or natural gas, is burned. Exhaust gasses from the gas turbine engine are pushed out by one or more gas turbines. The exhaust gasses pass over a heat recovery steam generator, heating the water within to generate steam. The gas turbine load and exhaust gas temperature are highly coupled due to combustion system and control limitations. Such limitations generally result in a one-to-one relationship between gas turbine exhaust mass flow rate and gas turbine exhaust temperature, which lead to a direct one-to-one relationship between steam flow rate and steam temperature. The steam is collected in a boiler and builds up pressure. When a sufficient steam pressure is reached, the steam is admitted into the steam turbine, thereby rotating the steam turbine. The steam is then typically condensed and returned to the heat recovery steam generator. The steam turbine rotates a generator to generate electricity. The steam admittance mechanism to the steam turbine can be configured in multiple configurations, including, for example, and without limitation, architectures where steam is heated and reheated in multiple stages and admitted to the steam turbine in multiple stages.

When not operating for a period of time, the shell and rotor of the steam turbine cool significantly. Temperature of the steam turbine rotor may be gauged by a temperature measured on the steam turbine rotor itself or on the shell, i.e., the fixed portion, rather than on the rotor, i.e., the rotatable portion. Alternatively, steam turbine rotor temperature may be gauged by any other suitable method, including, for example, and without limitation, non-contact methods such as pyrometry. During startup of a combined cycle power plant, the plant is ideally brought to conditions where plant load can be controlled without constraints as quickly as possible. However, the surface of the steam turbine rotor typically heats at a different rate than the bulk of the rotor, resulting in radial temperature variations throughout the rotor. Such temperature variations manifest as thermal stress on the metal of the rotor and contribute to rotor metal fatigue over time. Because the temperature of the gas turbine exhaust gases drive steam temperature, the overall plant is constrained by the need to keep gas turbine exhaust flow at a lower temperature until the steam turbine rotor has been brought to conditions where rotor surface stresses are not limiting.

BRIEF DESCRIPTION

In one aspect, a control system for a power plant is provided. The control system includes a temperature sensor and a controller. The temperature sensor is configured to measure a rotor surface temperature of a steam turbine rotor. The rotor surface temperature is a function of exhaust gasses from a heat source used to heat steam to a target steam temperature. The controller is coupled to the temperature sensor. The controller is configured to compute the target steam temperature using an inverse process model for steam turbine rotor stress dynamics, and based on a reference steam turbine rotor stress and a feedback steam turbine rotor stress. The controller is further configured to compute a measured steam turbine rotor stress based on a measured surface temperature of the steam turbine rotor. The controller is further configured to compute an estimated steam turbine rotor stress using a process model for the steam turbine rotor stress dynamics, and based on the target steam temperature. The controller is further configured to compute the feedback steam turbine rotor stress based on the measured steam turbine rotor stress and the estimated steam turbine rotor stress.

In another aspect, a method of controlling a power plant is provided. The method includes heating steam using exhaust gasses expelled from a heat source, the exhaust gasses having an exhaust gas temperature. The method further includes admitting the steam into a steam turbine at a steam flow rate. The method further includes measuring a steam turbine rotor surface temperature. The method further includes determining a feedback steam turbine rotor stress based on the steam turbine rotor surface temperature and a process model for the steam turbine rotor stress dynamics. The method further includes computing a target steam turbine rotor stress based on the feedback steam turbine rotor stress and a reference steam turbine rotor stress. The method further includes computing a target steam temperature for controlling the heat source and the exhaust gas temperature based on the target steam turbine rotor stress and an inverse process model for the steam turbine rotor stress dynamics.

In yet another aspect, a power plant is provided. The power plant includes a gas turbine engine, a steam turbine, a temperature sensor, and a controller. The gas turbine engine is configured to rotate under a gas turbine load and expel exhaust gasses at an exhaust gas temperature, the exhaust gasses configured to heat steam to a target steam temperature. The steam is admitted into the steam turbine at the target steam temperature a steam flow rate. The steam turbine is configured to rotate an electrical generator. The temperature sensor is configured to measure a steam turbine rotor surface temperature. The controller is configured to compute the target steam temperature using an inverse process model for steam turbine rotor stress dynamics, and based on a reference steam turbine rotor stress and a feedback steam turbine rotor stress. The controller is further configured to compute a measured steam turbine rotor stress based on a measured surface temperature of the steam turbine rotor. The controller is further configured to compute an estimated steam turbine rotor stress using a process model for the steam turbine rotor stress dynamics, and based on the target steam temperature. The controller is further configured to compute the feedback steam turbine rotor stress based on the measured steam turbine rotor stress and the estimated steam turbine rotor stress.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The control systems for power plants described herein provide internal model control of exhaust gas temperatures from one or more gas turbines to manage thermal stresses on a steam turbine rotor. Thermal stress typically occurs in the steam turbine rotor during startup of the power plant, where steam temperatures and steam flow cause temperature variations between the steam turbine rotor surface and the bulk of the steam turbine rotor as the steam turbine is brought up to operating temperature. The control systems described herein facilitate control of steam temperature and management of thermal stress independent of loading of the one or more gas turbines and variations in steam flow.

Figure 1:
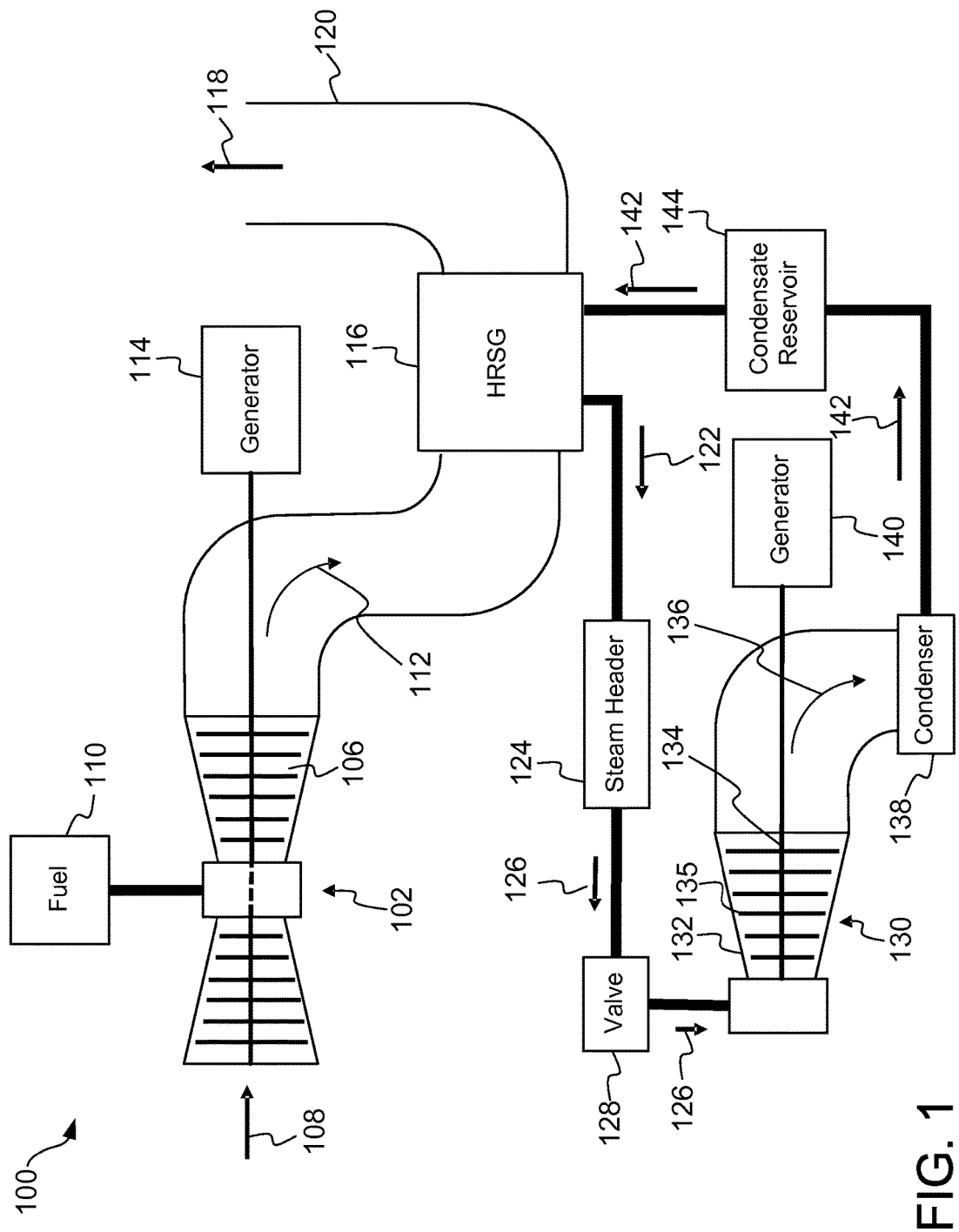
FIG. 1 is a block diagram of an exemplary combined cycle power plant.

FIG. 1 is a block diagram of an exemplary combined cycle power plant 100, within which the control systems and methods introduced herein may be embodied or carried out. Combined cycle power plant 100 includes a gas turbine engine 102 within which air 108 is mixed and burned with fuel 110 to produce exhaust gasses 112 that are expelled through a gas turbine 106. Exhaust gasses 112 cause gas turbine 106 to rotate. Gas turbine 106 is rotatably coupled to a generator 114, which rotates with gas turbine 106 and generates electricity.

Gas turbine 106 expels exhaust gasses 112 into a heat recovery steam generator 116. Cooled exhaust gasses 118 leave heat recovery steam generator 116 and are typically expelled from combined cycle power plant 100 through an exhaust duct 120. Exhaust gasses 112 enter heat recovery steam generator 116 at an exhaust gas temperature. The exhaust gas temperature is controllable by controlling the combustion process through regulation of air 108 admission and fuel 110 admission within gas turbine engine 102. Heat recovery steam generator 116 facilitates heat transfer from exhaust gasses 112 to water 142 and steam 122.

Steam 122 builds up within a steam header 124 until a desired steam pressure is achieved. When the desired steam pressure is achieved, pressurized steam 126 is released through a valve 128. When valve 128 is opened, pressurized steam 126 is admitted into a steam turbine 130. Steam turbine 130 includes a steam turbine shell 132 that is fixed, and a rotatable steam turbine rotor 134. Steam turbine 130 includes a plurality of steam turbine buckets 135 coupled to steam turbine rotor 134. As pressurized steam 126 is admitted onto steam turbine buckets 135, steam turbine rotor 134 rotates and exhaust steam 136 is directed to a condenser 138. Steam turbine rotor 134 is coupled to a generator 140 that rotates with steam turbine 130 and generates electricity. Condenser 138 cools exhaust steam 136, forming condensate 142 that is collected in a condensate reservoir 144. Condensate 142 is then returned to heat recovery steam generator 116 where it is transformed again to steam 122.

In operation, during startup of combined cycle power plant 100, steam turbine 130 is accelerated and loaded through generator 140. As steam flow increases the electrical load increases while steam turbine 130 maintains speed. It is desirable to bring steam turbine 130 up to the operating temperature as quickly as possible, however the rate at which this startup can be carried out is limited by the stresses induced on steam turbine 130 due to steam temperature and steam flow. More specifically, operating parameters or thermal stresses on steam turbine rotor 134 limit startup rate. A higher steam temperature heats steam turbine rotor 134 more quickly, as will higher steam flow. However, heating steam turbine rotor 134 results in temperature differentials between a surface of steam turbine rotor 134 and a bulk of steam turbine rotor 134 (neither shown). Such temperature differentials result in thermal stresses and metal fatigue on steam turbine rotor 134 over time.

Also in operation, steam turbine 130 is brought up to the operating temperature according to a steam turbine rotor stress profile to manage steam turbine rotor stress during startup. The steam turbine rotor stress profile characterizes steam turbine rotor stress incurred during startup. Steam turbine rotor surface temperature is controlled through regulation of a steam temperature of steam 122 and is also a function of steam flow into steam turbine 130. Steam temperature is controlled through regulation of exhaust gas temperature of exhaust gasses 112, which is controlled as described above.

Figure 2:
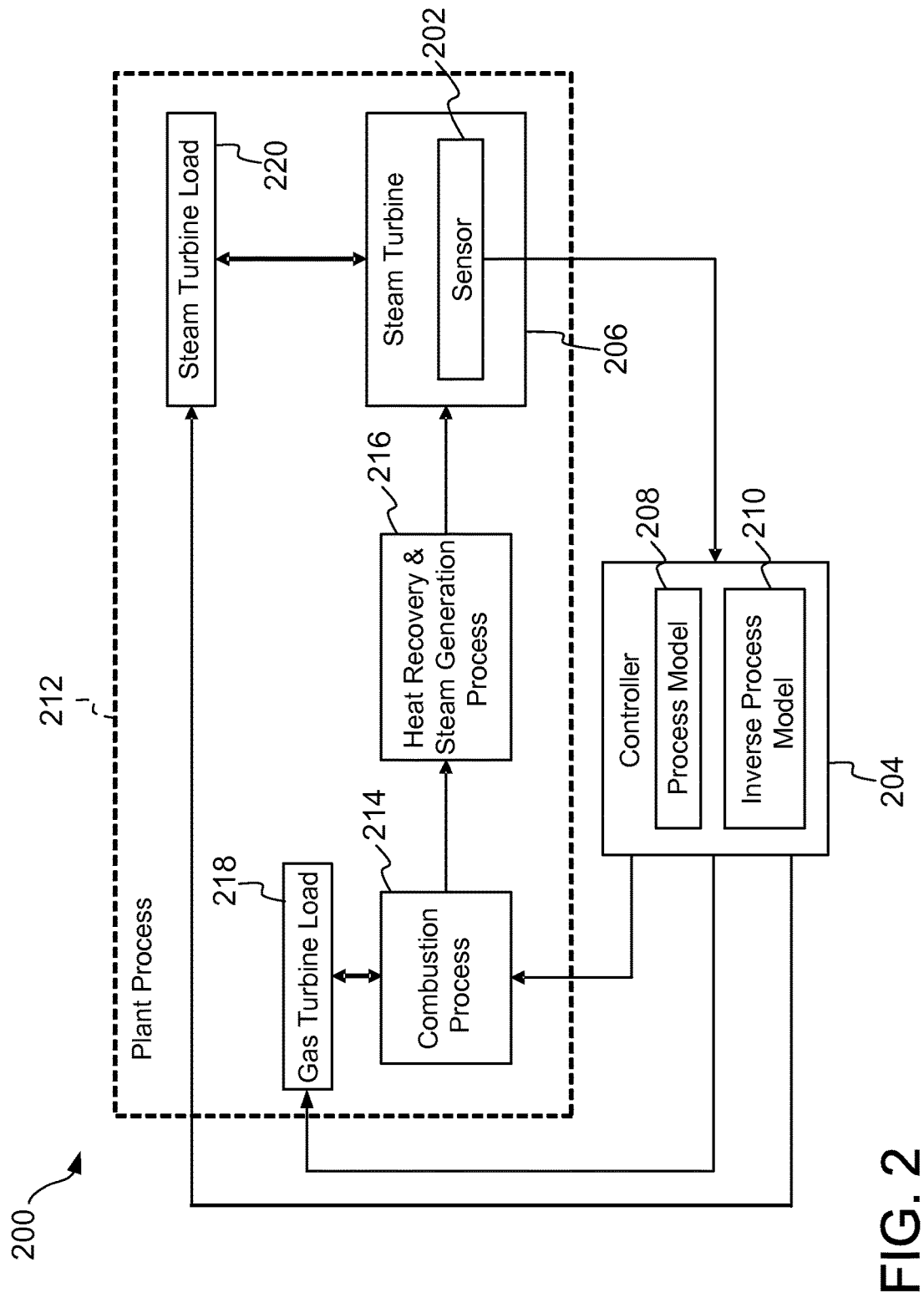
FIG. 2 is a block diagram of an exemplary control system for use in a power plant, such as the combined cycle power plant shown in FIG. 1.

FIG. 2 is a block diagram of an exemplary control system 200 for controlling a power plant, such as combined cycle power plant 100 (shown in FIG. 1). Control system 200 includes a sensor 202 and a controller 204. Sensor 202 is a temperature sensor configured to measure the surface temperature of a steam turbine rotor, such as steam temperature rotor 134 (shown in FIG. 1). Sensor 202, in certain embodiments, is configured to measure the steam turbine rotor temperature directly. In other embodiments, sensor 202 is configured to measure the steam turbine shell temperature, which is related to the steam turbine rotor surface temperature. Likewise, in certain embodiments, the steam turbine rotor and steam turbine shell temperatures can be estimated based on steam conditions measured by sensor 202. Sensor 202 may coupled to a steam turbine 206, such as steam turbine 130 (shown in FIG. 1). In certain embodiments, for example, sensor 202 is coupled to a steam turbine shell, such as steam turbine shell 132 (shown in FIG. 1). Certain embodiments include another sensor for measuring steam flow.

Controller 204 includes a process model 208 and an inverse process model 210. Process model 208 models a plant process 212. Plant process 212 includes a combustion process 214 by which fuel, such as fuel 110, and air, such as air 108, are combined in a gas turbine engine, such as gas turbine engine 102, and burned to produce exhaust gasses, such as exhaust gasses 112 (all shown in FIG. 1). The generated exhaust gases are expelled from the gas turbine engine through a gas turbine, such as gas turbine 106 (shown in FIG. 1). As the exhaust gasses are expelled through the gas turbine, the gas turbine drives a gas turbine load 218. Gas turbine load 218 includes, for example, and without limitation, an electrical generator, such as generator 114 (shown in FIG. 1).

Plant process 212 includes a heat recovery and steam generation process 216 by which the exhaust gasses are expelled into a heat recovery steam generator, such as heat recovery steam generator 116 (shown in FIG. 1), to heat steam, such as steam 122 (also shown in FIG. 1). The generated steam is admitted into steam turbine 206, rotating a rotor of steam turbine 206 and driving a steam turbine load 220. Steam turbine load 220 includes, for example, and without limitation, an electrical generator, such as generator 140 (shown in FIG. 1).

Plant process 212 induces stress onto the rotor of steam turbine 206 as a function of at least the steam temperature and steam flow. Process model 208 estimates the steam turbine rotor stress resulting from plant process 212. Controller 204 determines a measured steam turbine rotor stress and uses a difference of the measured steam turbine rotor stress and the estimated steam turbine rotor stress to control plant process 212. The difference represents disturbances applied to plant process 212 after the control input, or may represent un-modeled dynamics. The difference is fed back and subtracted from a reference steam turbine rotor stress. The reference steam turbine rotor stress is drawn from a reference steam turbine rotor stress profile according to which the power plant is started up.

A difference of the reference steam turbine rotor stress and the steam turbine rotor stress variations, sometimes referred to as a target steam turbine rotor stress, is used by inverse process model 210 to compute a steam temperature. The steam temperature is translated to a commanded exhaust gas temperature that can be controlled through combustion process 214.

Controller 204 is further configured to control loading of the gas turbine through gas turbine load 218, which drives the amount of steam generated in heat recovery steam generator 216, which further drives the power generated by steam turbine 206.

Figure 3:
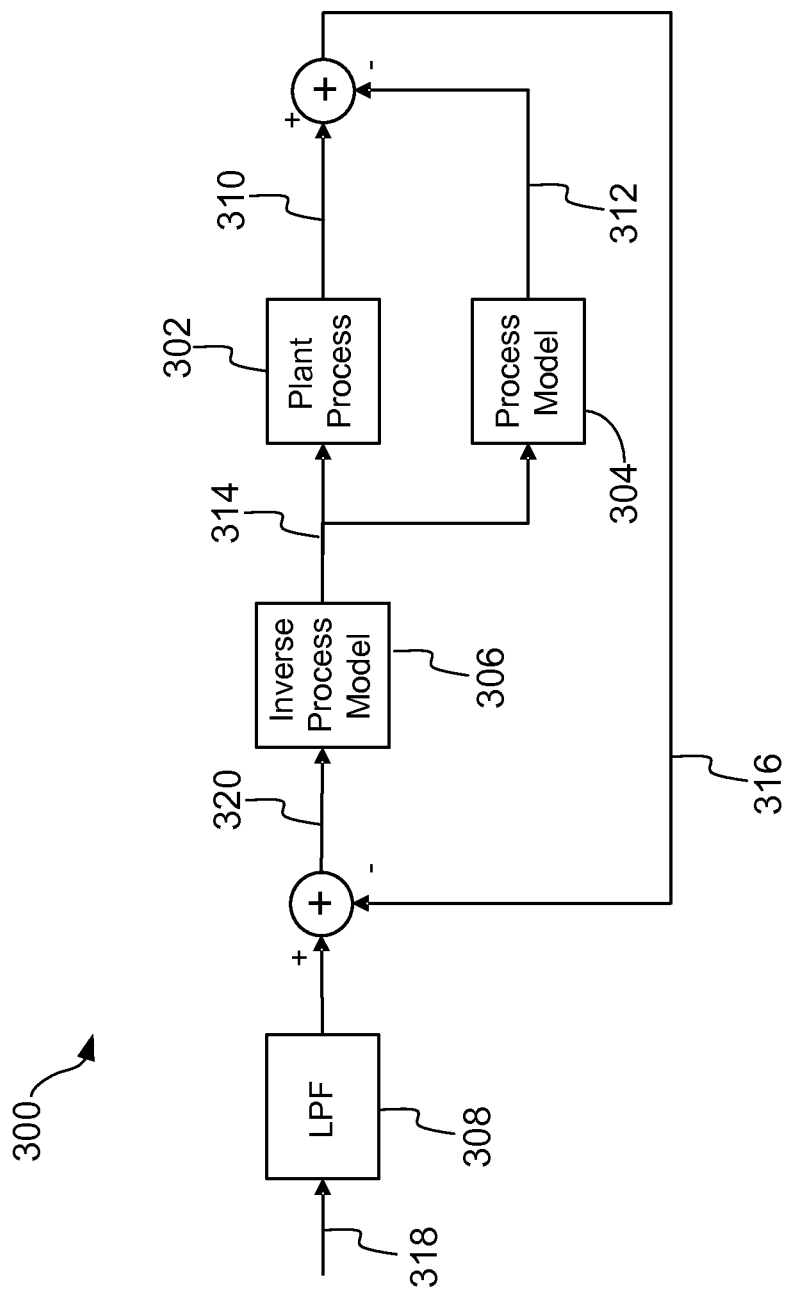
FIG. 3 is a schematic diagram of an exemplary control system for use in a power plant, such as the combined cycle power plant shown in FIG. 1.

FIG. 3 is a schematic diagram of an exemplary control system 300 for use in a power plant, such as combined cycle power plant 100 (shown in FIG. 1). Control system 300 includes a plant process 302, such as plant process 212 (shown in FIG. 2), and a process model 304, such as process model 208 (also shown in FIG. 2). Control system 300 further includes an inverse process model 306 and low-pass filter (LPF) 308.

Plant process 302 yields stress on a steam turbine rotor, such as steam turbine rotor 134 (shown in FIG. 1), that is measurable based on steam turbine rotor surface temperature. The stress is expressed as a measured steam turbine rotor stress 310, and is a function of various aspects of plant process 302, including, for example, and without limitation, steam temperature, steam flow, and loading of the steam turbine and the gas turbine, such as gas turbine 106 (shown in FIG. 1). Process model 304 computes an estimated steam turbine rotor stress 312 based at least on a target steam temperature 314.

A feedback steam turbine rotor stress 316 is a difference between measured steam turbine rotor stress 310 and estimated steam turbine rotor stress 31, which is fed back and subtracted from a reference steam turbine rotor stress 318. Feedback steam turbine rotor stress 316 represents an estimation error, as well as unmeasured disturbances to plant process 302 and un-modeled dynamics. The result is a target steam turbine rotor stress 320. LPF 308 is configured to smooth the signal representing reference steam turbine rotor stress 318. In certain embodiments, LPF 308 is omitted.

Inverse process model 306 is configured to convert target steam turbine rotor stress 320 to target steam temperature 314. In combined cycle power plants, plant process 302 is generally controllable through exhaust gas temperature rather than steam temperature directly. In certain embodiments, control system 300 further includes a model component for translating steam temperature 314 to a commanded exhaust gas temperature. Further, in certain embodiments, control system 300 includes a closed-loop control system for the gas turbine exhaust temperature to attain target steam temperature 314.

Figure 4:
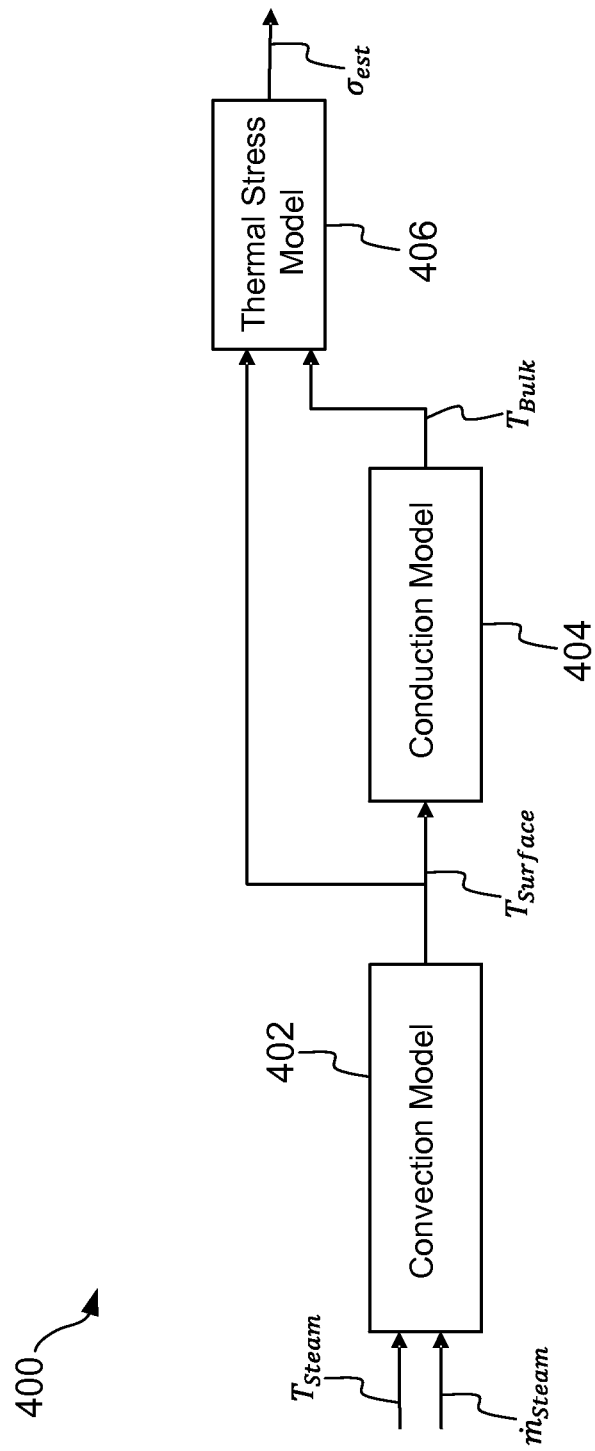
FIG. 4 is a schematic diagram of an exemplary process model for use in the control systems shown in FIGS. 2 and 3.

FIG. 4 is a schematic diagram of an exemplary process model 400 for use in control systems 200 and 300 (shown in FIGS. 2 and 3, respectively). Process model 400 includes a convection model 402, a conduction model 404, and thermal stress model 406.

Convection model 402 represents dynamics of heat transfer from generated steam, such as steam 122 (shown in FIG. 1), to a surface of a steam turbine rotor, such as steam turbine rotor 134 (also shown in FIG. 1), over time. Convection model 402 utilizes two inputs: a steam temperature, $T_{Steam}$, such as target steam temperature 314 (shown in FIG. 3), and a steam mass flow, $\dot{m}_{Steam}$, which is either measurable directly or can be inferred from another measurement in control systems 200 and 300, such as a pressure measured at valve 128 (shown in FIG. 1). Convection model 402 further utilizes a heat transfer coefficient, $k_1$, for heat transfer from steam to the surface of the steam turbine rotor. Convection model 402 is governed by Equation 1 below, by which an estimated steam turbine rotor surface temperature, $T_{Surface}$, is solved:

$$\frac{dT_{Surface}}{dt} = k_1 \dot{m}_{Steam}(T_{Steam} - T_{Surface}). \qquad \text{Equation 1}$$

Conduction model 404 represents dynamics of heat transfer from the surface of the steam turbine rotor to a bulk of the steam turbine rotor over time. Conduction model 404 computes an estimated steam turbine bulk temperature, $T_{Bulk}$, based on the estimated steam turbine rotor surface temperature, $T_{Surface}$. Conduction model 404 is governed by the Heat Equation, Equation 2, below:

$$\frac{\partial^2 T}{\partial x^2} = \frac{1}{\alpha} \frac{\partial T}{\partial t}, \quad \text{Equation 2}$$

where T represents a solid temperature, x represents the spatial dimension, a represents the thermal diffusivity of the material, and t represents the temporal variable. A relationship between surface temperature and bulk temperature can be obtained by discretizing the partial differential equation using a suitable method.

Thermal stress model 406 is configured to compute an estimated thermal stress, $\sigma_{est}$, on the steam turbine rotor based on the estimated steam turbine rotor surface temperature, $T_{Surface}$, and the estimated steam turbine bulk temperature, $T_{Bulk}$. Thermal stress model 406, which is described further in U.S. Pat. No. 6,939,100, incorporated herein by reference, also utilizes a coefficient, $k_2$, and is governed by Equation 3 below:

$$\sigma_{est} = k_2(T_{Surface} - T_{Bulk}). \quad \text{Equation 3}$$

Figure 5:
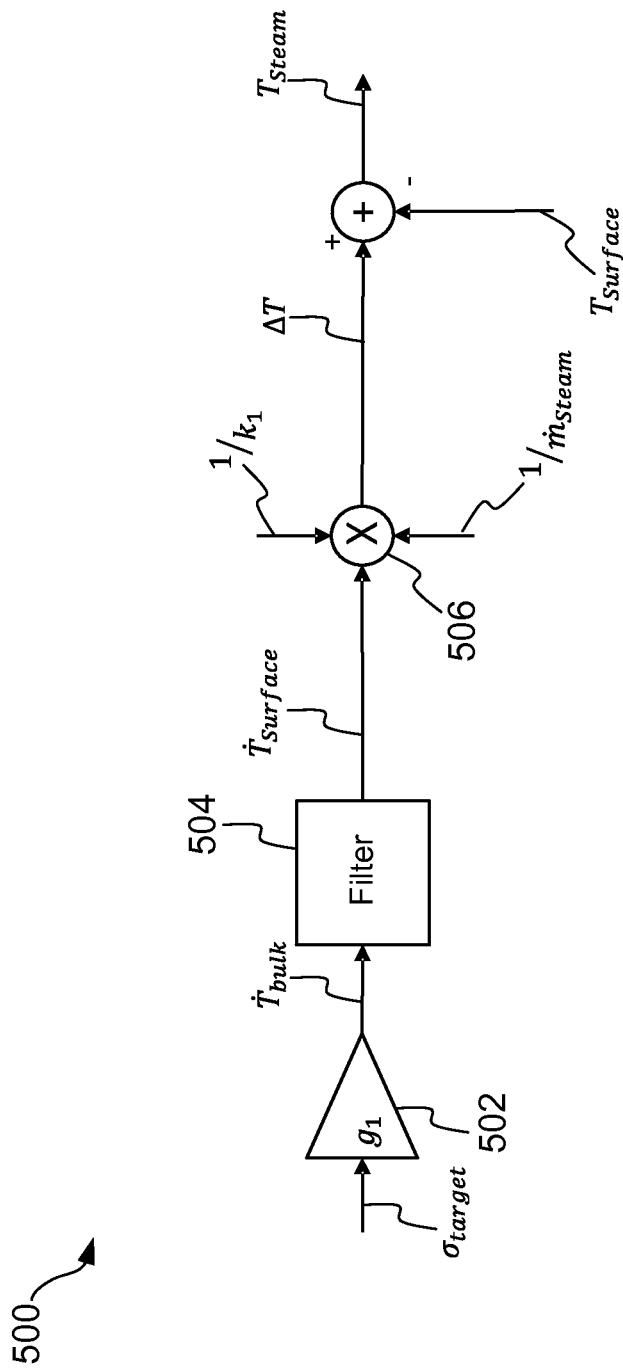
FIG. 5 is a schematic diagram of an exemplary inverse process model for use in the control systems shown in FIGS. 2 and 3.

FIG. 5 is a schematic diagram of an exemplary inverse process model 500 for use in control systems 200 and 300 (shown in FIGS. 2 and 3, respectively). Inverse process model 500 includes a scalar converter 502, a filter 504, and multiplier 506. Inverse process model 500 is configured to be a mathematical inverse of process model 400 (shown in FIG. 4). Scalar converter 502 applies a gain, $g_1$, that represents dynamics for converting from a target steam turbine rotor stress, $\sigma_{target}$, to a time derivative of an average steam turbine rotor temperature, $\dot{T}_{avg}$.

Filter 504 includes a lead/lag filter governed by Equation 4 below. Filter 504 yields a time derivative of the steam turbine rotor surface temperature, $\dot{T}_{Surface}$.

$$\frac{\tau_1 s + 1}{\tau_2 s + 1}, \quad \text{Equation 4}$$

where $\tau_1$ and $\tau_1$ represent two time constants, and s represents the Laplace variable.

Multiplier 506 solves Equation 1 above for the temperature differential, $T_{Steam} - T_{Surface}$, between the estimated steam turbine rotor surface temperature, $T_{Surface}$, and the target steam temperature, $T_{Steam}$. Multiplier 506 effectively divides the time derivative of the steam turbine rotor surface temperature, $\dot{T}_{Surface}$, by heat transfer coefficient $k_1$ and steam mass flow $\dot{m}_{Steam}$ to solve for a desired temperature differential, $\Delta T$. Target steam temperature, $T_{Steam}$, is then computed by subtracting the estimated steam turbine rotor surface temperature computed in convection model 402 from the desired temperature differential, $\Delta T$.

Figure 6:
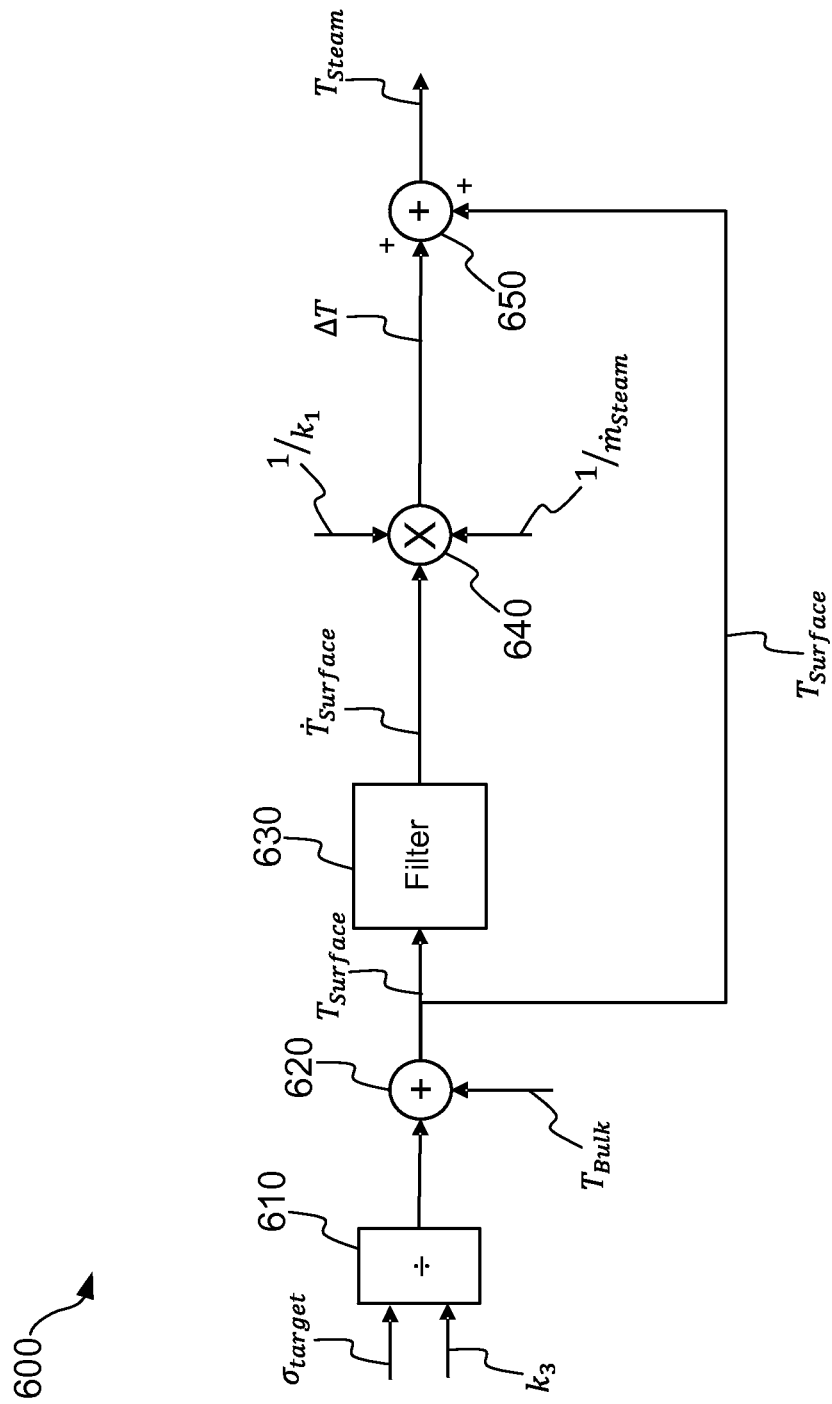
FIG. 6 is a schematic diagram of another exemplary inverse process model for use in the control systems shown in FIGS. 2 and 3.

FIG. 6 is a schematic diagram of an exemplary inverse process model 600 for use in control systems 200 and 300 (shown in FIGS. 2 and 3, respectively). Inverse process model 600 includes a divider 610 that divides a target steam turbine rotor stress by a constant $k_3$ to determine an ideal temperature differential between the steam turbine rotor bulk and the steam turbine rotor surface.

Inverse process model 600 includes a summer 620 configured to sum the ideal temperature differential with an estimated steam turbine rotor bulk temperature, $T_{bulk}$, resulting in a target steam turbine rotor surface temperature, $T_{Surface}$.

Inverse process model 600 includes a filtered differentiator 630 that applies the filter given by Equation 5:

$$\frac{s}{\tau \cdot s + 1}, \quad \text{Equation 5}$$

where, $\tau$ is a time constant and s is the Laplace variable. The filtered differentiation of the target steam turbine rotor surface temperature yields the time derivative of the steam turbine rotor surface temperature, $\dot{T}_{Surface}$.

Multiplier 640 solves Equation 1 above for the temperature differential, $T_{Steam} - T_{Surface}$, between the target steam turbine rotor surface temperature, $T_{Surface}$, and the target steam temperature, $T_{Steam}$. Multiplier 640 effectively divides the time derivative of the steam turbine rotor surface temperature, $\dot{T}_{Surface}$, by heat transfer coefficient $k_1$ and steam mass flow $\dot{m}_{Steam}$ to solve for a desired temperature differential, $\Delta T$. Target steam temperature, $T_{Steam}$, is then computed by summing, at summer 650, the target steam turbine rotor surface temperature and the desired temperature differential, $\Delta T$.

Figure 7:
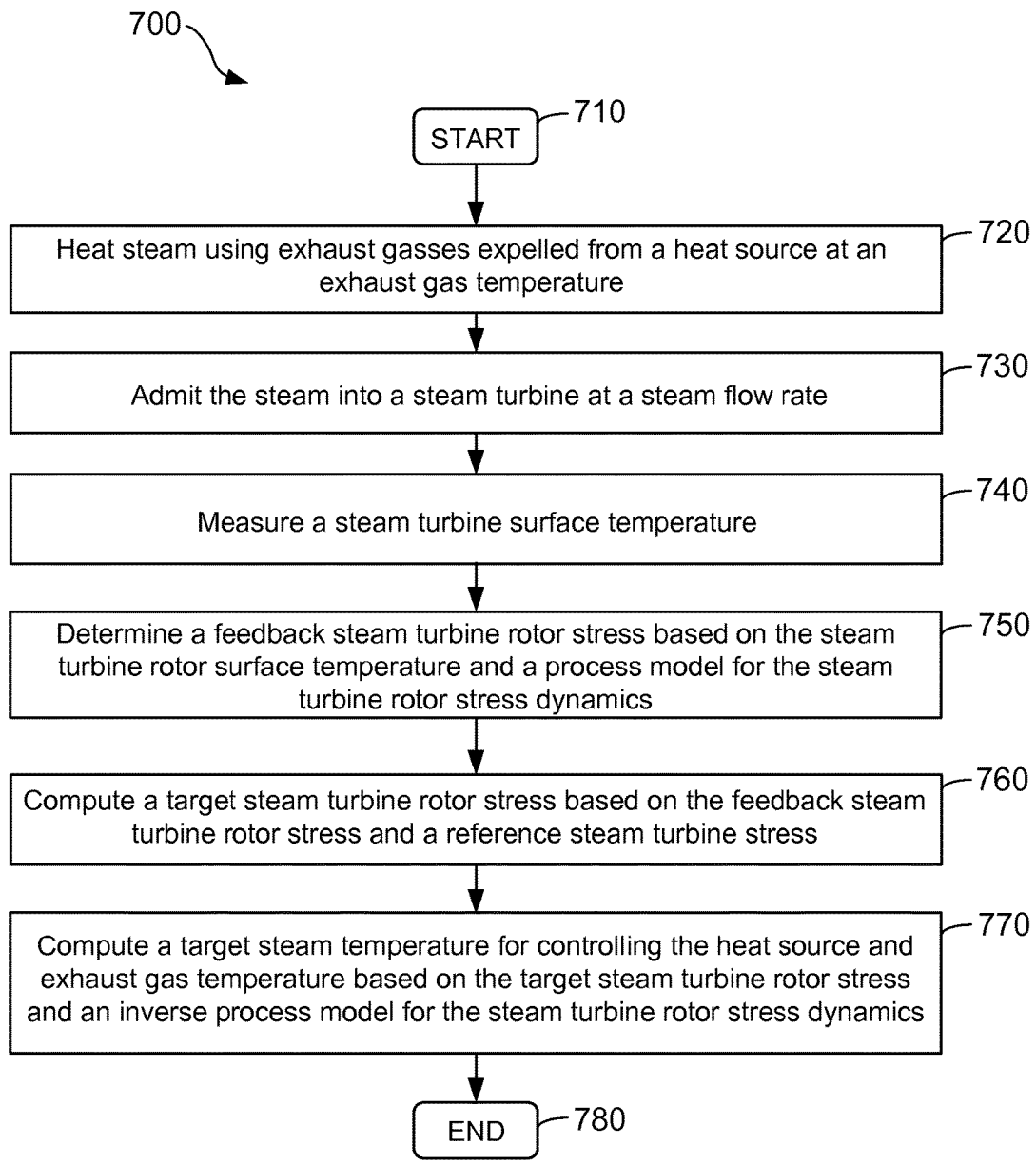
FIG. 7 is a flow diagram of an exemplary method of controlling a power plant, such as the combined cycle power plant shown in FIG. 1.

FIG. 7 is a flow diagram of an exemplary method 700 of controlling startup of a power plant, such as combined cycle power plant 100, using a control system, such as control systems 200 and 300 (shown in FIGS. 2 and 3, respectively), and further using a controller, such as controller 204 (shown in FIG. 2). Now referring to FIGS. 1, 3, and 6, method 700 begins at a start step 710. At a heat recovery and steam generation step 720, steam 122 is heated to a target steam temperature, $T_{Steam}$, using exhaust gasses 112 expelled from gas turbine 106 at an exhaust temperature. When sufficient pressure is reached in steam header 124, pressurized steam 126 is admitted, at a steam admission step 730, into steam turbine 130 at a steam flow rate.

As steam 122 moves through steam turbine rotor 134, steam turbine rotor surface temperature is measured at a temperature measurement step 740, from which measured steam turbine rotor stress 310 is computed. At a stress feedback step 750, process model 304 for the steam turbine rotor stress dynamics is used to compute an estimated steam turbine rotor stress 312 based on the target steam temperature 314 and the steam flow rate, $\dot{m}_{Steam}$. Feedback steam turbine rotor stress 316 is computed as a difference of measured steam turbine rotor stress 310 and the estimated steam turbine rotor stress 312.

At a target steam turbine rotor stress step 760, target steam turbine rotor stress 320 is computed based on feedback steam turbine rotor stress 316 and reference steam turbine rotor stress 318.

At an inverse modeling step 770, inverse process model 306 is used to compute target steam temperature 314 for controlling the heat source and temperature of exhaust gasses 112. Inverse process model 306 receives target steam turbine rotor stress 320 as an input, and computes target steam temperature 314 based on a target temperature differential, $\Delta T$, between the surface of steam turbine rotor 134 and pressurized steam 126. The method ends at an end step 780.

Figure 8:
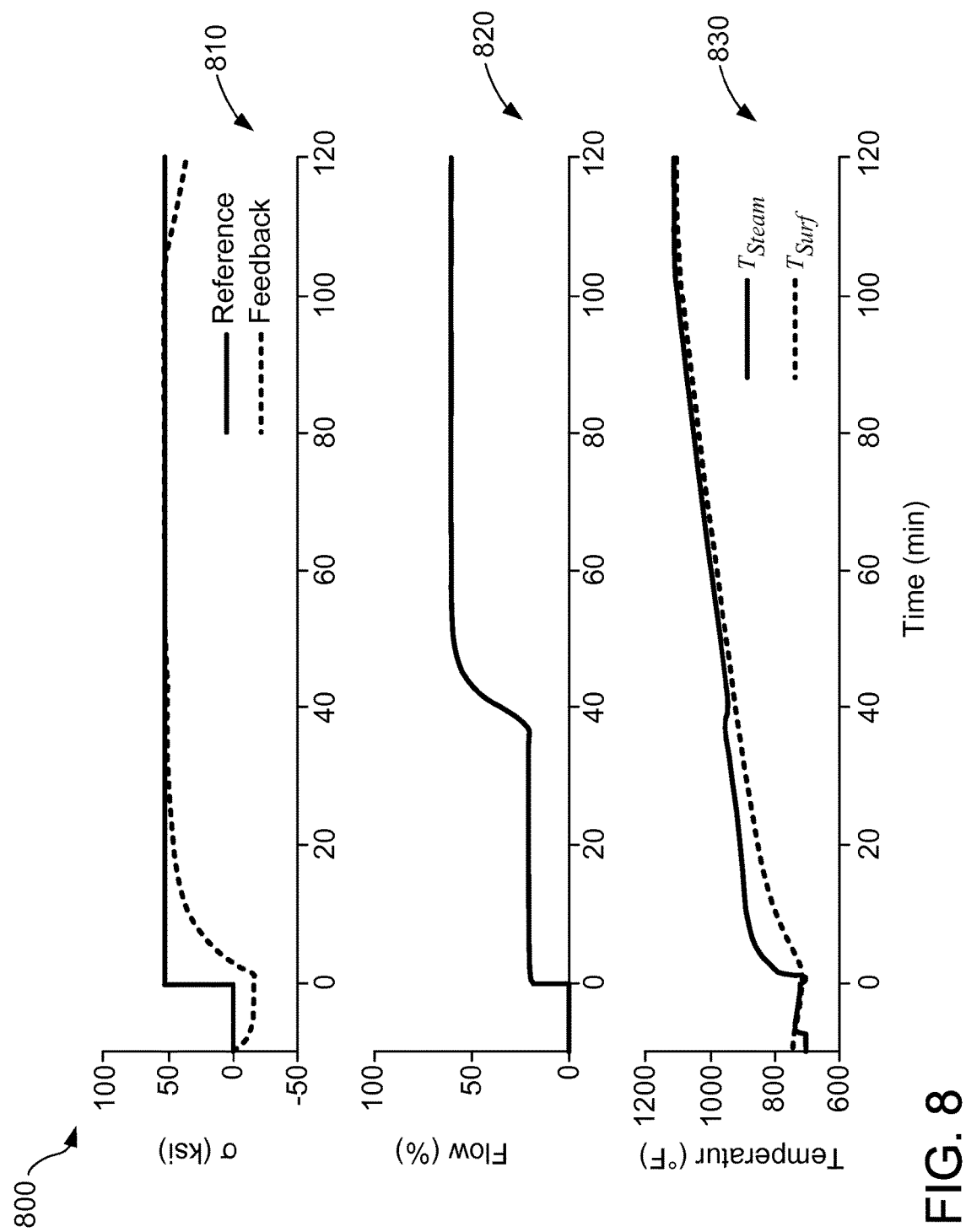
FIG. 8 is a plot of an exemplary combined cycle power plant startup for use in the combined cycle power plant shown in FIG. 1.

FIG. 8 is a plot 800 of an exemplary combined cycle power plant startup for use in combined cycle power plant 100 (shown in FIG. 1) and control systems 200 and 300

(shown in FIGS. 2 and 3, respectively). Plot 800 includes a stress profile subplot 810, a steam flow subplot 820, and a temperature subplot 830.

Stress profile subplot 810 includes a reference steam turbine rotor stress profile, shown in black, and an actual steam turbine rotor stress resulting from the plant process, such as plant process 212 (shown in FIG. 2), shown in grey, versus time. The reference steam turbine rotor stress profile illustrates a reference steam turbine rotor stress of 50 kilopounds per square inch (ksi). The actual steam turbine rotor stress, beginning at time zero, begins to climb toward 50 ksi.

Steam flow subplot 820 illustrates changes in steam flow over the course of the startup. The steam flow rises sharply at time zero and then again around 40 minutes. Temperature subplot 830 illustrates steam temperature, $T_{Steam}$, shown in black, and steam turbine rotor surface temperature, $T_{Surface}$, shown in grey, versus time. The plot of steam temperature, $T_{Steam}$, illustrates the control system, such as control systems 200 and 300 (shown in FIGS. 2 and 3, respectively), modifying target steam temperature, $T_{Steam}$, to account for the spike in flow rate at 40 minutes, without causing an increase in the actual steam turbine rotor stress.

The above described control systems for power plants provide internal model control of exhaust gas temperatures from one or more gas turbines to manage thermal stress on a steam turbine. Thermal stress typically occurs in the steam turbine rotor during startup of the power plant, where steam temperatures and steam flow cause temperature variations between the steam turbine rotor surface and the bulk of the steam turbine rotor as the steam turbine is brought up to operating temperature. The control systems described herein facilitate control of steam temperature and management of thermal stress independent of loading of the one or more gas turbines and variations in steam flow.

An exemplary technical effect of the methods, systems, and apparatus described herein includes at least one of: (a) approximating steam turbine rotor stress over time; (b) controlling steam temperature independent of gas turbine loading and steam flow; (c) reducing the time necessary to bring the steam turbine up to operating temperature and speed; (d) reducing startup time for power plants; (e) reducing thermal stress on steam turbine rotors; (f) improving life cycle of steam turbines; and (g) increasing availability of power generated by power plants.

Exemplary embodiments of methods, systems, and apparatus for controlling power plants are not limited to the specific embodiments described herein, but rather, components of systems and/or steps of the methods may be utilized independently and separately from other components and/or steps described herein. For example, the methods may also be used in combination with other non-conventional control systems, and are not limited to practice with only the systems and methods as described herein. Rather, the exemplary embodiment can be implemented and utilized in connection with many other applications, equipment, and systems that may benefit from improved startup times, reduced steam turbine rotor stress, improved life cycle, and increased power availability.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The limitations of the following claims are not written in means-plus-function format and are not intended to be interpreted under 35 U.S.C. § 112(f), unless and until such claim limitations expressly use the phrase "means for" followed by a statement of function and void of further structure.

What is claimed is:

1. A control system for a power plant, said control system comprising:
    a temperature sensor configured to measure a surface temperature of a steam turbine rotor, the surface temperature a function of exhaust gasses from a heat source used to heat steam to a target steam temperature; and
    a controller coupled to said temperature sensor, said controller configured to:
        compute the target steam temperature using an inverse process model for steam turbine rotor stress dynamics that uses a reference steam turbine rotor stress and a feedback steam turbine rotor stress;
        compute a steam turbine rotor stress based on a measured surface temperature of the steam turbine rotor;
        compute an estimated steam turbine rotor stress using a process model for the steam turbine rotor stress dynamics, and based on the target steam temperature; and
        compute the feedback steam turbine rotor stress based on the measured steam turbine rotor stress and the estimated steam turbine rotor stress.

2. The control system in accordance with claim 1, wherein the heat source comprises a gas turbine engine.

3. The control system in accordance with claim 1, wherein said temperature sensor is configured to measure a steam, turbine shell temperature from which the surface temperature of the steam turbine rotor is determinable.

4. The control system in accordance with claim 1, wherein said controller is further configured to compute the feedback steam turbine rotor stress as a difference between the measured steam turbine rotor stress and the estimated steam turbine rotor stress.

5. The control system in accordance with claim 4, wherein said controller is further configured to compute the target steam temperature based on a difference of the reference steam turbine rotor stress and the feedback steam turbine rotor stress.

6. The control system in accordance with claim 1, wherein said controller is further configured to low-pass filter the reference steam turbine rotor stress.

7. The control system in accordance with claim 1, wherein said controller is further configured, using the inverse process model, to compute the target steam temperature based on an estimated surface temperature of the steam turbine rotor and a target temperature differential between the target steam temperature and the measured surface temperature of the steam turbine rotor.

8. The control system in accordance with claim 1, wherein said controller is further configured to compute an exhaust gas temperature based on the target steam temperature and a heat exchange model for heat exchange from the exhaust gasses to the steam.

9. A power plant, comprising:
- a gas turbine engine configured to rotate under a gas turbine load and expel exhaust gasses at an exhaust gas temperature, the exhaust gasses configured to heat steam to a target steam temperature;
- a steam turbine into which the steam is admitted at the target steam temperature and a steam flow rate, said steam turbine configured to rotate an electrical generator;
- a temperature sensor configured to measure a stem turbine rotor surface temperature; and
- a controller configured to:
  - compute the target steam temperature using an inverse process model for steam turbine rotor stress dynamics, and based on a reference steam turbine rotor stress and a feedback steam turbine rotor stress;
  - compute a steam turbine rotor stress based on a measured surface temperature of the steam turbine rotor;
  - compute an estimated steam turbine rotor stress using a process model for the steam turbine rotor stress dynamics the target steam temperature; and
  - compute the feedback steam turbine rotor stress based on the measured steam turbine rotor stress and the estimated steam turbine rotor stress.

10. The power plant in accordance with claim 9, wherein said controller is further configured to compute the measured steam turbine rotor stress based on variations in steam flow and loading of the gas turbine engine.

11. The power plant in accordance with claim 10, wherein said controller is further configured to compute the feedback steam turbine rotor stress as a difference of the measured steam turbine rotor stress and the estimated steam turbine rotor stress.

12. The power plant in accordance with claim 10, wherein said controller is further configured to compute the estimated steam turbine rotor stress based on a steam mass flow and the target steam temperature.

13. The power plant in accordance with claim 12, wherein said controller is further configured to compute the estimated steam turbine rotor stress based on:
- a convection model for computing convection from the steam to a rotor surface of said steam turbine;
- a conduction model for computing conduction from said rotor surface to a bulk of said steam turbine based on an estimated steam turbine rotor surface temperature; and
- a stress computation based on a difference of the estimated steam turbine rotor surface temperature from said convection model and an estimated steam turbine rotor bulk temperature from said conduction model.

14. The power plant in accordance with claim 9, wherein said controller is further configured to low-pass filter the reference steam turbine rotor stress.

* * * * *